United States Patent
Karg et al.

[11] Patent Number: 6,154,932
[45] Date of Patent: Dec. 5, 2000

[54] KNOTLESS SECURING DEVICE

[76] Inventors: Daniel W. Karg, 620 Timberline Dr., Akron, Ohio 44333; Michael A. Dunton, 1054 Morningview Dr., Tallmadge, Ohio 44278

[21] Appl. No.: 08/916,248

[22] Filed: Aug. 22, 1997

[51] Int. Cl.[7] .................................................. F16G 11/00
[52] U.S. Cl. .......................................................... 24/131 R
[58] Field of Search .............................. 24/370, 373, 376, 24/131 R, 129 R, 129 C, 132 R, 134 R

[56] References Cited

U.S. PATENT DOCUMENTS

| | | | |
|---|---|---|---|
| 331,746 | 12/1885 | Watson . | |
| 771,251 | 10/1904 | Howe . | |
| 785,019 | 1/1905 | Parker . | |
| 1,103,849 | 7/1914 | Stenborg . | |
| 1,159,501 | 11/1915 | Kimbark | 24/129 C X |
| 1,351,625 | 8/1920 | Crosbie | 24/131 R |
| 1,365,872 | 1/1921 | Voss | 24/131 R |
| 1,495,912 | 5/1924 | Liefer | 24/131 R |
| 1,984,961 | 12/1934 | Becker | 24/131 R |
| 2,216,487 | 10/1940 | Domagala | 24/131 R X |
| 4,723,634 | 2/1988 | Fisk | 188/65.4 |
| 4,745,663 | 5/1988 | Crowson | 24/131 R |
| 4,905,403 | 3/1990 | Manno . | |
| 5,217,092 | 6/1993 | Potter | 188/65.4 |
| 5,467,845 | 11/1995 | Scruggs | 188/65.2 |

OTHER PUBLICATIONS

Photocopy of packaging for "Why? Knot" (product for attaching fish hooks or lures to fishing line), undated.

*Primary Examiner*—James R. Brittain
*Attorney, Agent, or Firm*—Renner, Kenner, Greive, Bobak, Taylor & Weber

[57] ABSTRACT

A knotless securing device (10) includes a main shaft (14) with at least two loops (40) connected to each end of the main shaft (14). The length of the main shaft (14) between the loops (40) is long enough to accept a plurality of wraps of a rope (30) having a diameter of substantially equal to the diameter of the main shaft (14). A locking device (54) is connected to at least one of the loops (40) to hinder movements that would jeopardize the connection between the securing device (10) and the rope (30). A length of rope (30) is secured to the device (10) by first doubling over the rope (30) to form a fold (80). One loop (40) is passed through the fold (80), and the two ends (82, 84) are wrapped around the main shaft (14) a number of times and then passed through the other loop (40).

4 Claims, 7 Drawing Sheets

KNOTLESS SECURING DEVICE

TECHNICAL FIELD

The present invention generally relates to a device for securing a rope to a fixed body without the use of a knot. More specifically, the present invention relates to a knotless securing device that provides a frame about which a length of rope is wrapped such that friction prevents the rope from pulling off of the frame. Specifically, the present invention discloses a knotless securing device that provides a structure for frictionally securing a length of rope without the use of a knot, the structure having a locking device to prevent structural deformations from loosening the secured rope.

BACKGROUND ART

Over the centuries, numerous types of knots have been used to secure a rope to a fixed member so that a large force may be applied to the rope with almost no chance that the knot will fail and release the rope. When a knot is to be subjected to a large amount of force, it is desirable to use a knot that does not jam. When a large amount of force is applied to a jamming knot, the knot cinches and tightens on itself to an extent that it may become impossible to untie. A jamming knot that is typically known to the lay person is a simple overhand or granny knot.

Among the numerous knots that may be used to secure the end of a rope to another object, one of the most common and useful knots is the bowline knot. The bowline knot does not slip, pinch, or kink the rope, and does not jam and become difficult to untie. Although the bowline knot is relatively easy to tie when one has practiced the knot, it presents difficulties to a novice, especially when tying the knot under pressure or in the dark. Another difficultly with relatively complicated knots, such as the bowline, is that they are often learned in the upright and right-handed position, while in use a person may have to tie the knot upside down and left handed.

During an emergency situation requiring the connection of an end of a rope to a fixed body such as a large truck or a grounded eye ring or any other secured object, the person tying the securing knot is more likely to incorrectly tie the knot, thus endangering anyone who uses the rope. Such an occurrence is even more likely in a situation where the person tying the knot is relatively unskilled in the art of knot tying. When such a person must tie a critical knot under pressure, the resulting knot is often incorrectly formed and may pull out over time even if the knot initially feels secure. On the other hand, a person may tie an improper knot that jams upon application of a large force. Although such a knot is preferred to one that pulls out, the rope may have to be cut to retrieve it. Furthermore, knots are also known to weaken the rope at its junction point.

Various devices are known in the art that provide a controlled descent along a rope by providing a frame through or around which the rope may be wrapped. Friction between the rope and frame slows the descent of the frame against gravity and may slow it to a point where the frame may support an adult and yet provide a controlled descent. None of these devices, however, provide a simple frame that provides an uncomplicated method for connecting a rope such that no relative movement occurs between the rope and the frame. Thus, there is a need in the art to provide a device that provides an easy, reliable method for positively securing a rope without the use of a knot.

DISCLOSURE OF THE INVENTION

In view of the foregoing, it is an object of the present invention to provide a knotless securing device that provides an easy method for securing a rope without the use of a knot.

It is another object of the present invention to provide a knotless securing device, as above, that not only prevents the rope from pulling off of the device, but also does not allow the rope to jam.

It is yet a further object of the present invention to provide a knotless securing device, as above, that incorporates a locking device that hinders deformation of the securing device that would tend to jeopardize the connection between the rope and the securing device.

It is yet another object of the present invention to provide a knotless securing device, as above, that uses interactive friction to prevent the rope from pulling through the securing device.

In general, a knotless securing device for securing a rope includes a main shaft having a loop connected to both ends of the main shaft.

These and other objects of the present invention, which will become apparent from the description to follow, are accomplished by the improvements hereinafter described and claimed.

Two preferred embodiments of a knotless securing device are shown by way of example in the accompanying drawings without attempting to show all of the various forms and modifications in which the invention might be embodied, the invention being measured by the appended claims and not by the details of the specification.

PREFERRED EMBODIMENTS FOR CARRYING OUT THE INVENTION

Figure 1:
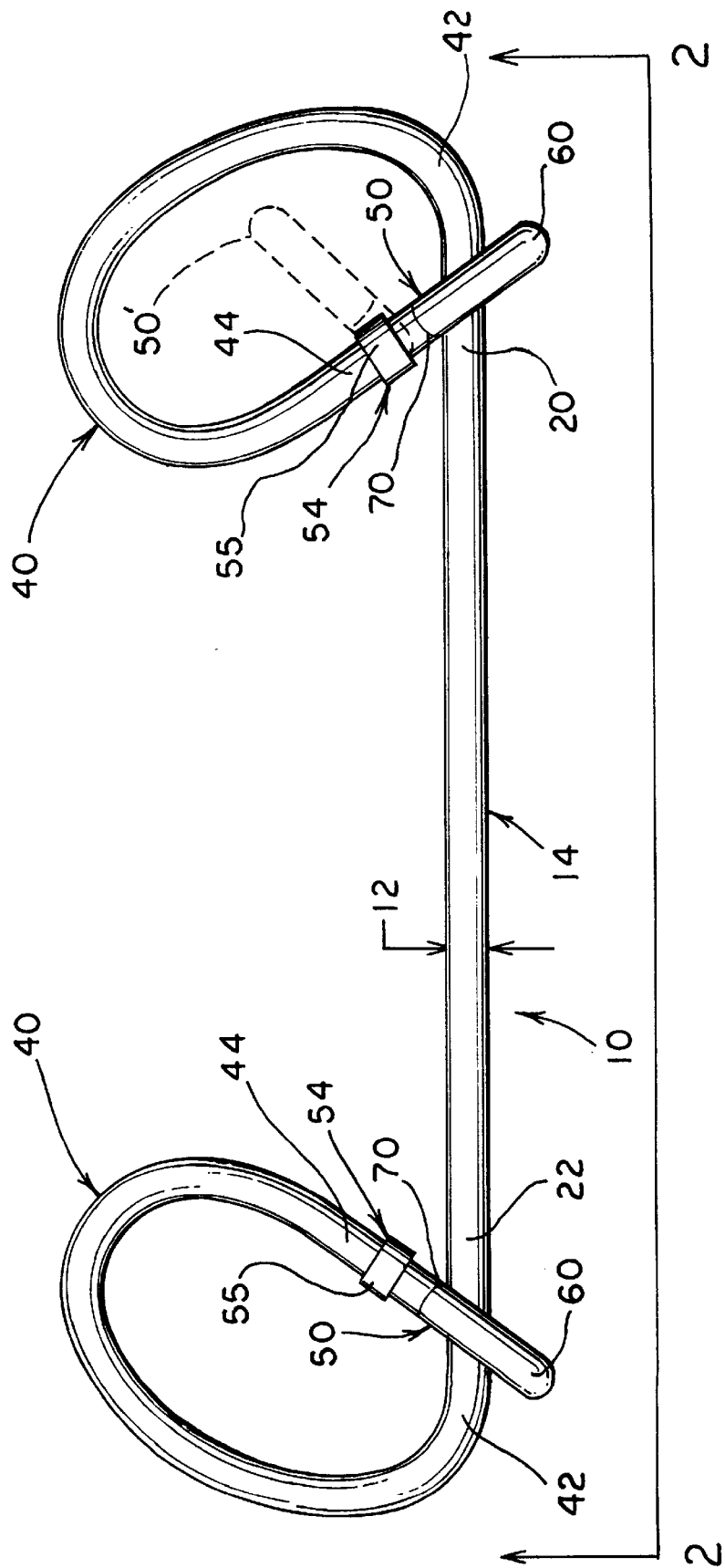
FIG. 1 is a top plan view of the first embodiment of a knotless securing device according to the concepts of the present invention.

A first embodiment of the knotless securing device according to the concepts of the present invention is generally indicated by the numeral 10 in FIGS. 1–4. The securing device 10 may be fabricated from round steel stock that is tempered after forming to provide a tensile strength of approximately ten thousand pounds or other suitable lifting capacity. The diameter of the stock, generally indicated by the dimension line 12, is proportional to the diameter of the rope intended to be used with the securing device 10. In some cases, it is desirable to match the diameter of the rope to the diameter 12 of the stock. For purposes of example only, the diameter 12 of the stock of the first embodiment of the present invention is approximately one-half inch, which may be used with one-half inch diameter rope. The device 10 may be fabricated from other suitable materials that provide adequate tensile strength for the intended use of the device 10.

The knotless securing device 10 includes a main shaft, generally indicated by the numeral 14, having a first end 20 and a second end 22. As may be seen in FIG. 3, the length of the main shaft 14 between ends 20, 22 is sufficient to allow a plurality of wraps and preferably at least 5 wraps of a doubled-over rope 30 thereabout. A loop, generally indicated by the numeral 40, is formed at each end 20, 22 of the main shaft 14. Each loop 40 has a first end 42 and a second end 44, with the first end 42 extending from the main shaft 14.

Figure 3:
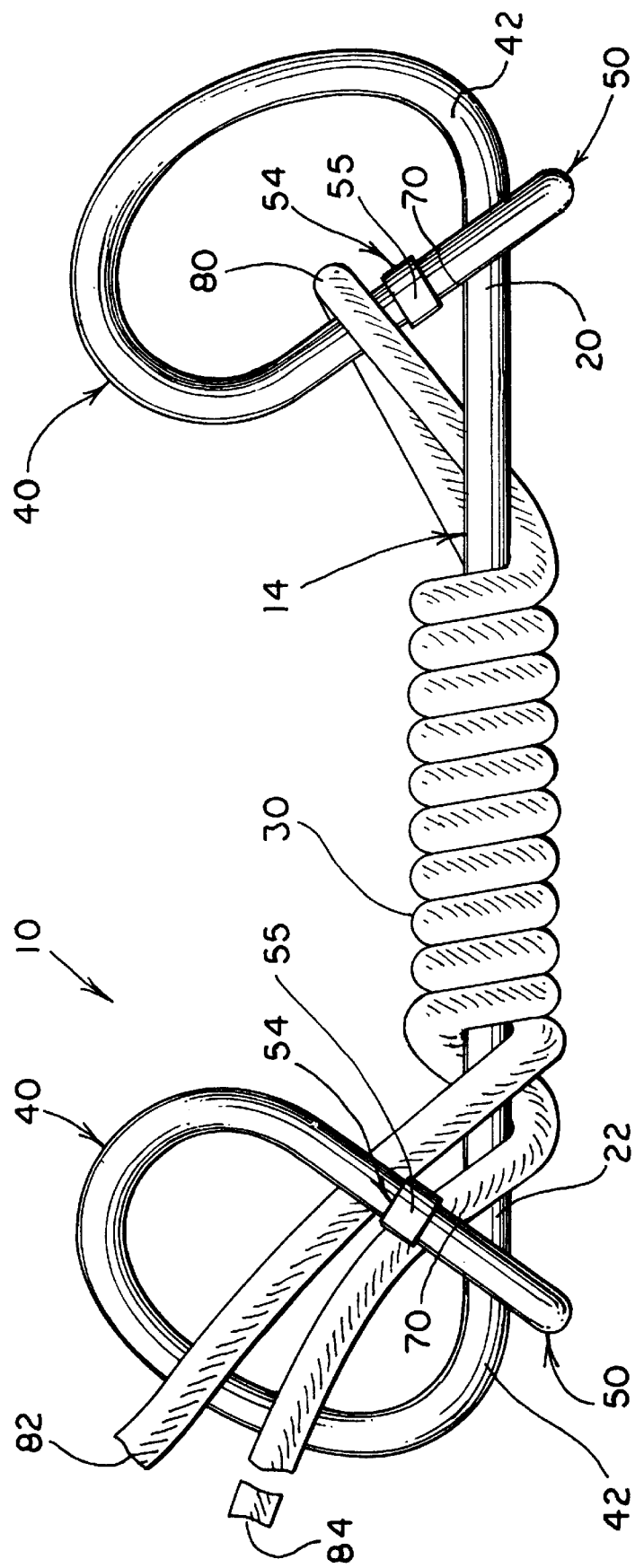
FIG. 3 is a top plan view showing the knotless securing device depicted in FIG. 1 with a length rope secured thereto.
Figure 4A:
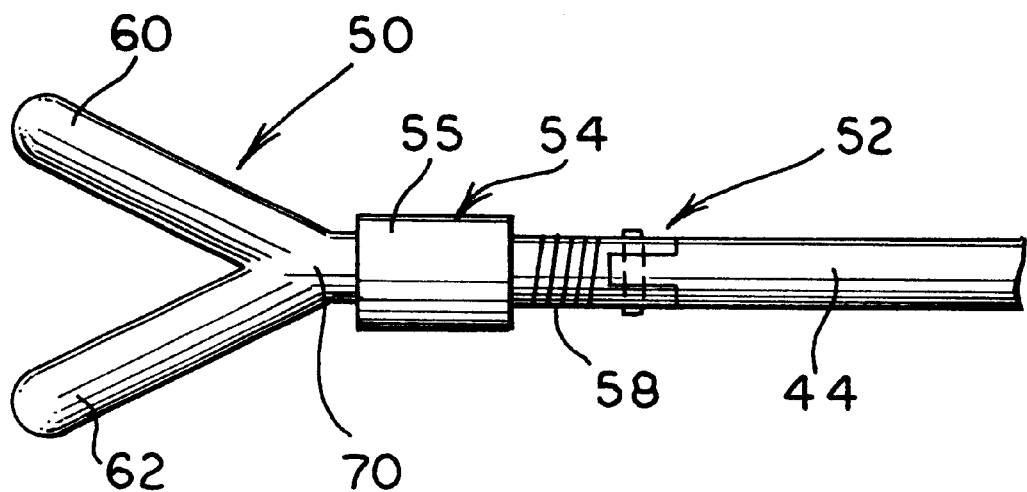
FIG. 4A is a side view of one of the gates in an unlocked position.

Each loop 40 also has a locking device or gate, generally indicated by the numeral 50, that is selectively pivotally connected to the second end 44 of the loop 40 as by a hinge that is generally indicated by the numeral 52 in FIG. 4A. Each loop 40 has a minimum diameter sized to readily accommodate fire department attaching devices such as tow hooks, large caribiners, and other attaching devices. In the exemplary embodiment depicted in FIGS. 1–3, each loop 40 has a minimum diameter of approximately three inches to accommodate such attaching devices.

Each hinge 52 allows the gate 50 to pivot inwardly toward the interior of the loop 40. Each hinge 52 is equipped with a stop or lock, generally indicated by the numeral 54, that selectively allows the gate 50 to pivot about the hinge 52.

Figure 4B:
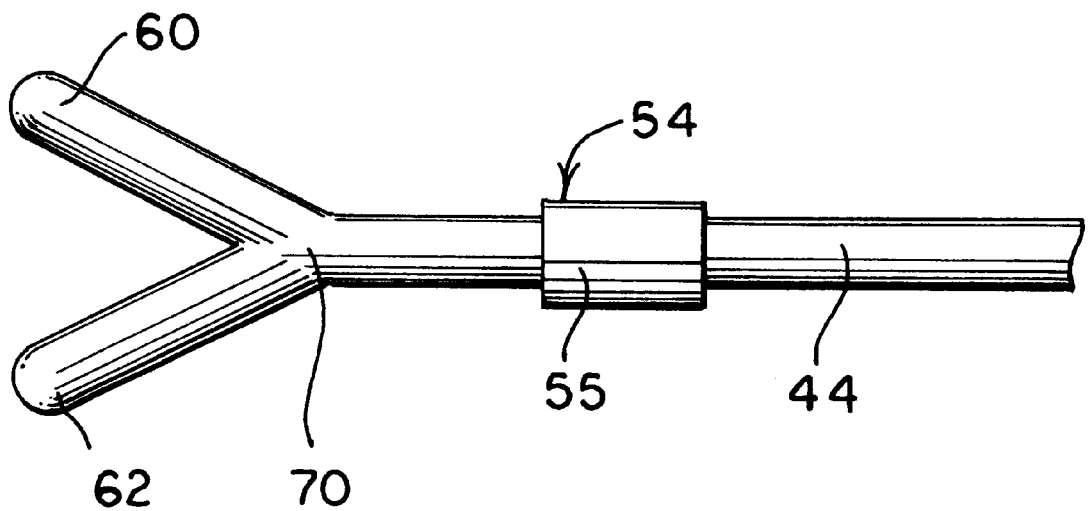
FIG. 4B is a side view of one of the gates in a locked position.

In the preferred embodiment of the present invention, the lock 54 includes a hollow, substantially cylindrical tube or sleeve 55 that is internally threaded with threads (not shown) that match a threading 58 that is formed on the gate 50. The lock sleeve 54 can be screwed onto the threads 58 (as shown in FIG. 4B) where it substantially overlies the hinge 52, thus preventing the gate 50 from pivoting. When the lock 54 is unscrewed (as shown in FIG. 4A), the hinge is uncovered and permitted to pivotally function.

Figure 2:
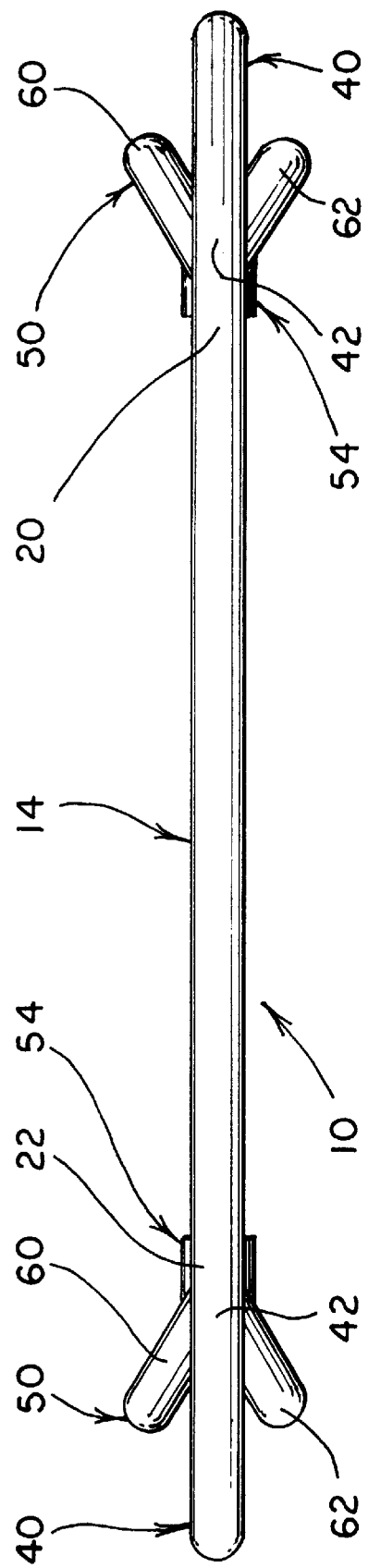
FIG. 2 is a side view of the knotless securing device taken substantially along line 2—2 of FIG. 1.

As may be best seen in FIG. 2, each gate 50 is bifurcated or forked into two tines 60, 62. The tines 60, 62 of the fork straddle the main shaft 14 to prevent the gate 50 from rotating back past the main shaft 14 if the stop or lock 54 on the hinge 52 fails. The second end 44 of each loop 40 is disposed just far enough from the main shaft 14 so that the rope 30 may pass therebetween. Each gate 50 is also sized such that when closed, the crotch 70 is normally substantially adjacent to the shaft 14, with the distance between the crotch 70 formed by the tines 60, 62 and the main shaft 14 being substantially smaller than the diameter of the rope 30. The tines 60, 62 are, however, sized to allow a rope 30 to easily pass between the gate 50 and the loop 40 as shown by the phantom line position of the gate 50' in FIG. 1.

The first embodiment of the knotless securing device 10 utilizes friction to secure a rope 30 thereto. To a secure a rope 30 to the device 10, the rope 30 is first doubled over to form a loop or fold 80 such that both ends 82 and 84 of the rope 30 are long enough to extend from one loop 40 past the other loop 40. In a normal situation, one end 84 of the rope 30 will be at the end of a long length of rope 30 that is to be utilized. The fold 80 is then placed over one loop 40, as shown in FIG. 3. The two ends 82, 84 are then wrapped around the main shaft 14 at least five times. The ends 82, 84 are then passed through the other loop 40 by opening the gate 50 and inserting the ends 82, 84.

Once wrapped and tensioned by way of force applied to end 84, the frictional forces between the wraps and the main shaft 14 prevent the rope 30 from pulling off of the securing device 10. If the fold 80 moves up onto the gate 50, the lock in the hinge 52 prevents the gate 50 from pivoting outwardly toward the main shaft. If the lock 54 fails, the crotch 70 of the tines 60, 62 will engage the main shaft 14, and the gate 50 is thus prevented from opening. In addition, the tines 60, 62 also function as a locking device by preventing the loops 40 from bending. For instance, if the force on the rope 30 imparted through end 84 and fold 80 is sufficient to deform a loop 40, on the crotch 70 of the fork contacts the main shaft 14 and resists such deformation.

Figure 5:
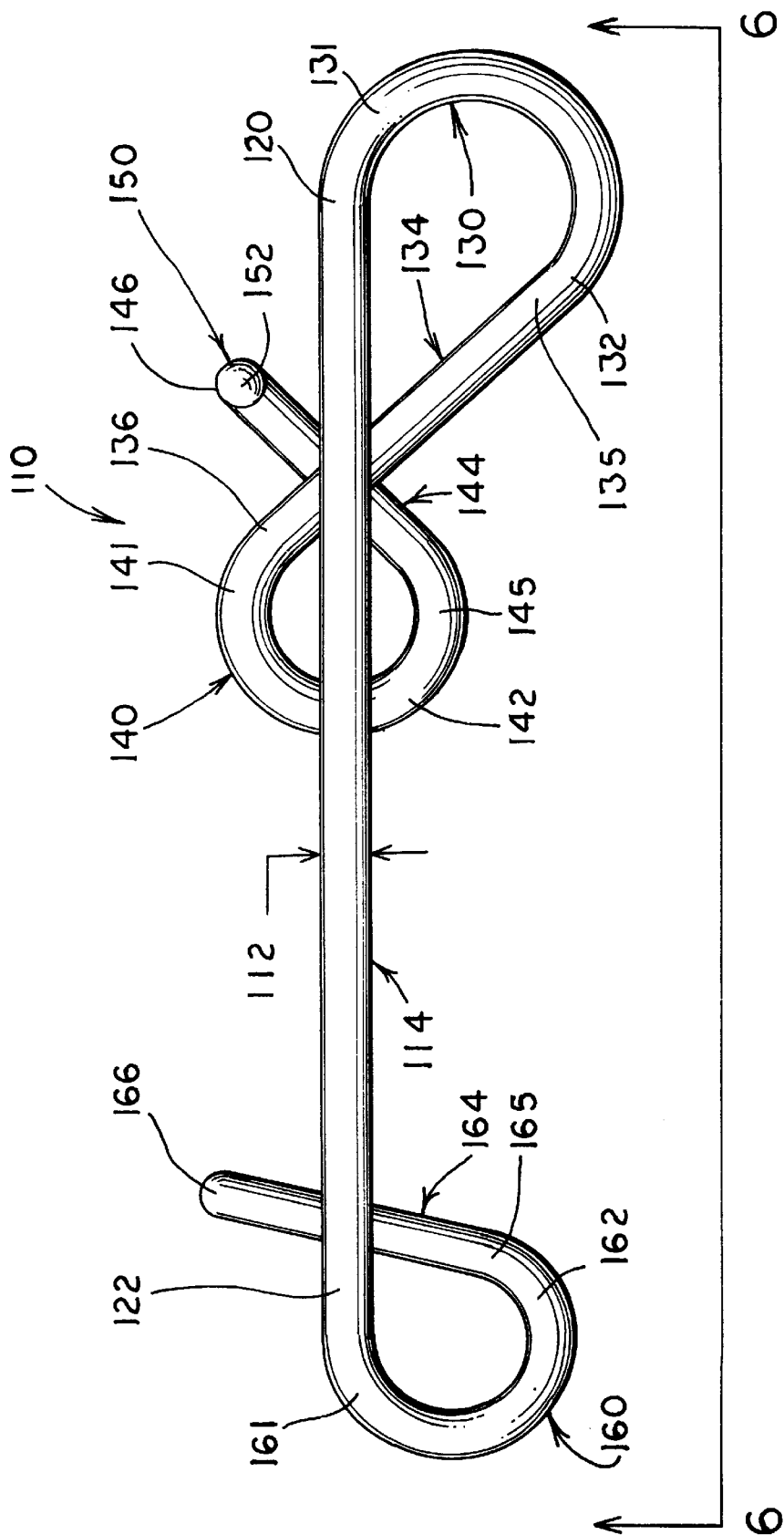
FIG. 5 is a top plan view of the second embodiment of the knotless securing device according to the concepts of the present invention.
Figure 6:
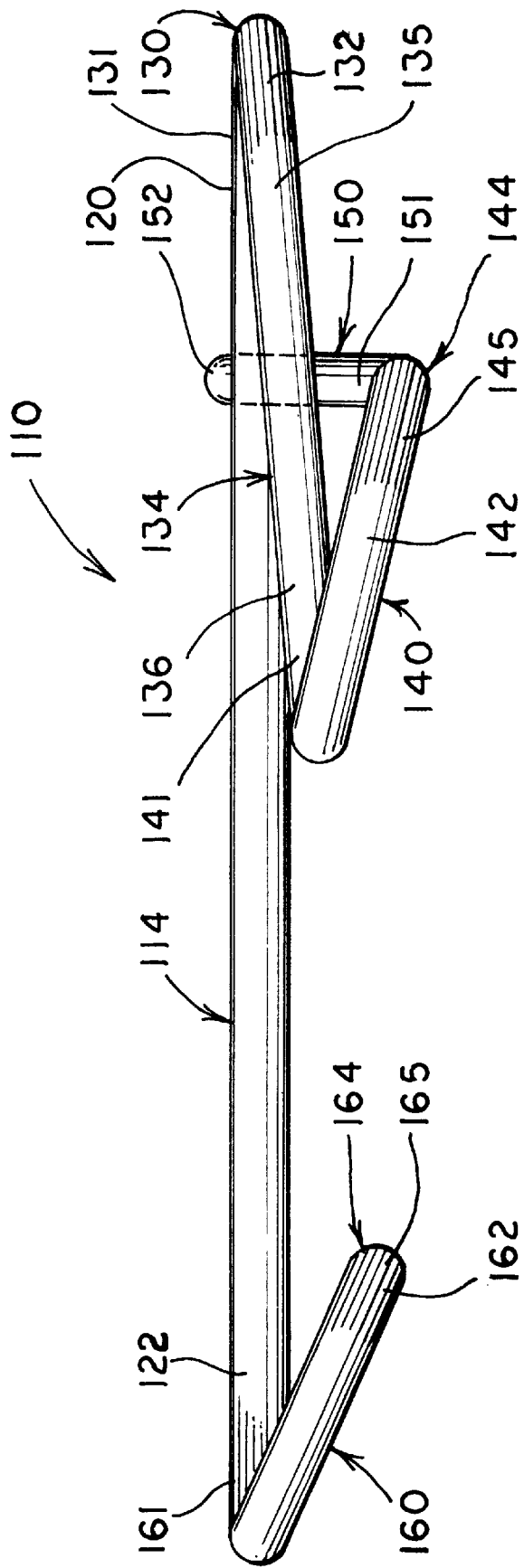
FIG. 6 is a side view of the knotless securing device taken substantially along line 6—6 of FIGS. 5.
Figure 7:
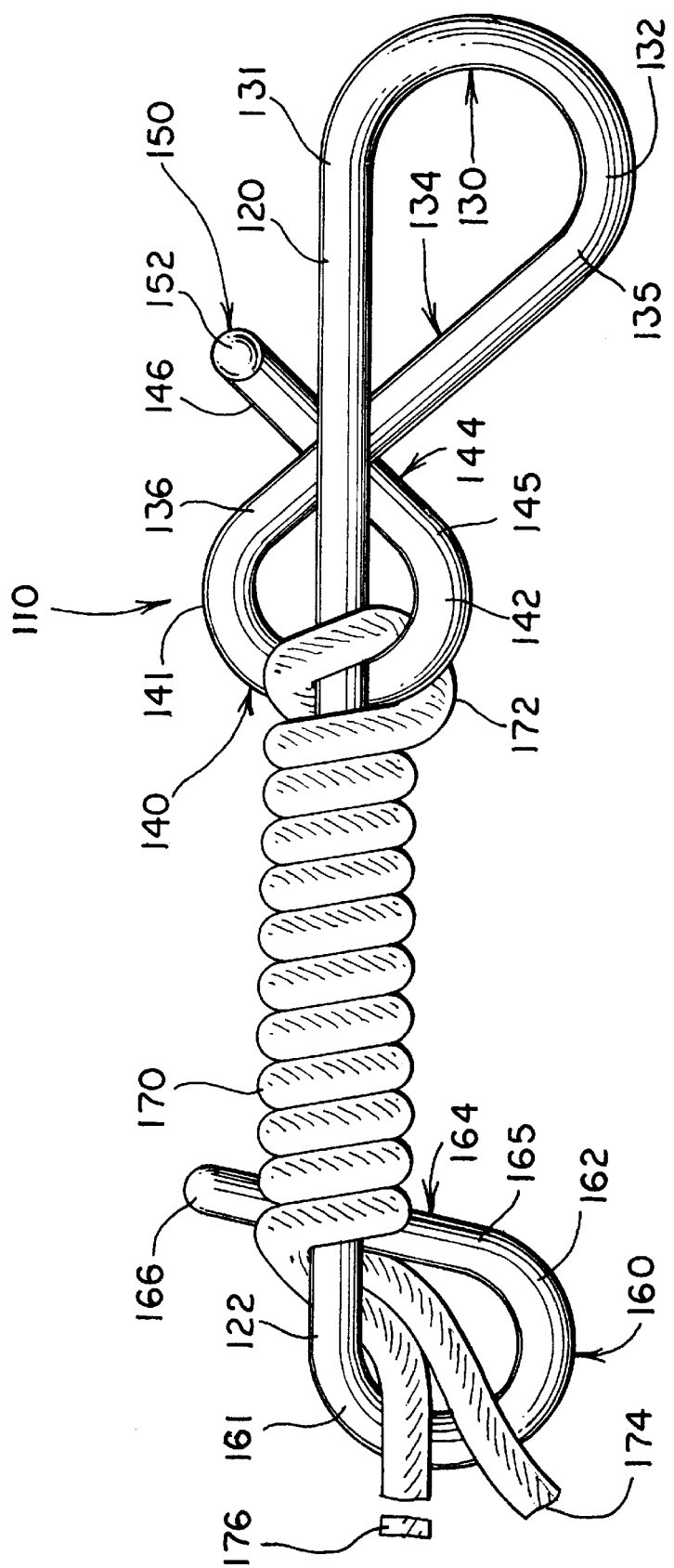
FIG. 7 is a top plan view showing the knotless securing device depicted in FIG. 5 with a length of rope secured thereto.

A second embodiment of the knotless securing device of the present invention is generally indicated by the numeral 110 in FIGS. 5–7. As explained with respect to the first embodiment of the present invention, the second embodiment of the securing device 110 may be fabricated from round steel stock that is tempered after forming to provide a tensile strength of approximately ten thousand pounds of lifting capacity. The diameter of the stock, generally indicated by the dimension line 112, is proportional to the diameter of the rope intended to be used with the securing device 110. In the second embodiment of the present invention, the diameter 112 of the bar stock is one-half inch, which corresponds to one-half inch diameter rope. However, in the other embodiments, the diameter of the rope may be different from the diameter 112 of the stock.

The knotless securing device 110 includes a main shaft, generally indicated by the numeral 114, having a first end 120 and a second end 122. The length of the main shaft 114 is sized to accommodate a plurality of wraps and preferably at least five wraps of doubled-over rope, as may be seen in FIG. 7. An anchoring loop, generally indicated by the numeral 130, extends from the first end 120 of the main shaft 114. The anchoring loop 130 has a first end 131 and a second end 132. An anchoring loop stem, generally indicated by the numeral 134, having both a first end 135 and a second end 136 extends substantially linearly from the second end 132 of the anchoring loop 130 and crosses under the main shaft 114. An eye loop, generally indicated by the numeral 140, having a first end 141 and a second end 142, extends from the second end 136 of the anchor loop stem 134.

An eye loop stem, generally indicated by the numeral 144, having a first end 145 and a second end 146, extends substantially linearly from the second end 142 of the eye loop 140. The eye loop stem 144 extends back under the main shaft 114 and the anchoring loop stem 134 such that the second end 146 of the eye loop stem 144 is adjacent to but displaced slightly from the main shaft 114. A locking bar, generally indicated by the numeral 150, having a first end 151 and a tip end 152, extends from the second end 146 of the eye loop stem 144 and past the main shaft 114, such that the locking bar 150 will engage the main shaft 114 if the locking bar 150 moves toward the main shaft 114.

The main shaft 114 extends past the eye loop 140 far enough to allow a doubled-over rope to be wrapped around the main shaft 114, as previously indicated. A retaining loop, generally indicated by the numeral 160, having a first end 161 and a second end 162, is connected to the second end 122 of the main shaft 114. A retaining loop stem, generally indicated by the numeral 164, having a first end 165 and a second end 166, is connected to the second end 162 of the retaining loop 160. The retaining loop stem 164 extends substantially linearly back under the main shaft 114 with a clearance equal to or slightly smaller than the diameter of a rope 170 for which the knotless securing device 110 is intended to be used.

Referring now to FIG. 7, to secure the rope 170 to the securing device 110, the rope 170 is first doubled over to form a loop or fold 172, such that both ends 174, 176 are sufficiently long to extend from the eye loop 140 well past the retaining loop 160. The fold 172 is then placed over the eye loop 140, as shown in FIG. 7. The two ends 174, 176 are then wrapped around the main shaft 114 at least five times. The ends 174, 176 are then passed through the retaining loop 160.

Once wrapped, the frictional forces between the wraps and the main shaft 114 prevent the rope 170 from pulling off of the device 110. If the force on the rope 170 causes the eye loop 140 or the anchoring loop 130 to deform, the locking bar 150 contacts the main shaft 114 and resists the deformation.

It is evident that the knotless securing device disclosed herein carries out the various objects of the invention set forth hereinabove and otherwise constitutes an advantageous contribution to the art. As will be apparent to persons skilled in the art, other modifications can be made to the preferred embodiment disclosed herein without departing from the spirit of the invention, the scope of the invention being limited solely by the scope of the attached claims.

What is claimed is:

1. A knotless securing device in combination with a rope comprising a main shaft having a first end and second end, a loop extending from each end of said main shaft, a locking device connected to at least one of said loops, said locking device comprising a locking bar extending from said loop adjacent said main shaft such that said locking bar engages said main shaft when said loop becomes deformed, and rope doubled over at one end thereof to create a fold and a doubled-over section, wherein said fold is placed over said locking device and through one of said loops, said doubled-over section is wrapped around said main shaft multiple times, and the remainder of said rope is passed through the other of said loops such that the frictional forces between said rope and said main shaft prevent said rope from pulling off the knotless securing device.

2. A knotless securing device comprising a main shaft having a first end and a second end, an anchoring loop attached to said first end of said main shaft, said anchoring loop having an anchoring loop stem, an eye loop connected to said anchoring loop stem, said eye loop having an eye loop stem, said anchoring loop stem being substantially disposed between said main shaft and said eye loop stem, a locking bar connecting t o said eye loop stem, said locking bar being substantially adjacent to said main shaft, and a retaining loop connected to said second end of said main shaft.

3. A knotless securing device in combination with a rope comprising a main shaft having a first end and a second end, an anchoring loop attached to said first end of said main shaft, said anchoring loop having an anchoring loop stem, an eye loop connected to said anchoring loop stem, said eye loop having an eye loop stem extending under said main shaft, a locking bar connecting to said eve loop stem, said locking bar being substantially adjacent to said main shaft and extending from said loop adjacent said main shaft such that said locking bar engages said main shaft when said loop becomes deformed, a retaining loop connected to said second end of said main shaft, and a rope doubled over at one end thereof to create a fold and a doubled-over section, wherein said fold is placed over said eve loop, said doubled-over section is wrapped around said main shaft multiple times, and the remainder of said rope is passed through said retaining loop such that the frictional forces between said rope and said main shaft prevent said rope from pulling off the knotless securing device.

4. A knotless securing device for a rope comprising a main shaft having a first end and a second end, an anchoring loop attached to said first end of said main shaft, a retaining loop connected to s aid second end of said ma in shaft, an eye loop connected to s aid anchoring loop and extending under said main shaft, a locking bar connected to said eye loop and being substantially adjacent to said main shaft on a side of said main shaft opposite said anchoring loop, whereby said locking bar is moveable into engagement with said main shaft upon deformation of said eye loop.

\* \* \* \* \*